UNITED STATES PATENT OFFICE.

PEDRO G. SALOM, OF PHILADELPHIA, PENNSYLVANIA, ASSIGNOR TO THE ELECTRICAL LEAD REDUCTION COMPANY, OF SAME PLACE AND DOVER, DELAWARE.

SECONDARY-BATTERY PLATE AND PROCESS OF MANUFACTURING SAME.

SPECIFICATION forming part of Letters Patent No. 647,426, dated April 10, 1900.

Application filed November 1, 1898. Serial No. 695,225. (No model.)

*To all whom it may concern:*

Be it known that I, PEDRO G. SALOM, a citizen of the United States, residing in Philadelphia, Pennsylvania, have invented certain Improvements in Secondary-Battery Plates and Processes of Manufacturing Same, of which the following is a specification.

The object of my invention is to provide in a simple and cheaper manner than usual a plate for secondary batteries, my improved plate occupying a position between an ordinary Planté plate of solid lead and the Brush-Faure plate, consisting of active material or material to become active applied to a grid or support of solid lead.

In carrying out my invention I take a mass of spongy lead produced in any available manner and subject the same to such pressure in a suitable mold that the particles of spongy lead will be caused to cohere, the mass while lacking the density of a cast-lead plate being so coherent or homogeneous that it will not be disintegrated by handling or by the electrochemical action known as "forming" the plate. When a plate of this character is subjected to the action of an electric current while contained in a suitable electrolyte, it can be much more readily oxidized than the usual solid lead Planté plate, owing to its lesser density, and as the plate consists throughout of a coherent homogeneous mass it is not as liable to disintegration as a plate consisting of a lead grid or support having active material or material to become active applied thereto in the form of paste or cement. Moreover, owing to the low cost of spongy lead as compared with solid cast-lead or lead oxid, my improved plate is much cheaper than any secondary-battery plate heretofore produced and of which I have knowledge.

In the manufacture of the plates above mentioned I prefer to regulate the amount of pressure, and consequently the relative density of the mass, according to the use to which the plate is to be applied. If, for instance, the plate is to be subjected to high rates of discharge, it is manifestly better to have the plate dense, and, on the other hand, if the plate is subjected to low rates of discharge the material used need not be compressed to such a degree; but it will be understood that while I prefer to manufacture the plates as above I do not limit myself to any particular degree of pressure, the object being to compress the entire mass of spongy lead to such a degree that it will act as a secondary-battery plate and have sufficient coherence to withstand ordinary usage.

The terminal may either form an integral part of the plate or may be soldered or otherwise secured thereto.

It will be understood that in manufacturing a plate according to my invention the surface of the plate may be either plain or of any desired configuration in order to increase the active surface.

Having thus described my invention, I claim and desire to secure by Letters Patent—

1. The mode herein described of making a secondary-battery plate without the use of a support-plate, said mode consisting in compressing a mass of spongy lead sufficiently to form a coherent homogeneous mass and arresting the application of pressure before the mass assumes the density of a cast-lead plate, substantially as described.

2. The within-described secondary-battery plate consisting of spongy lead compressed into a coherent homogeneous mass of less density than cast-lead, and constituting an electrode without separate support-plate, substantially as described.

3. The mode herein described of making a secondary-battery plate without the use of a support-plate, said mode consisting in placing a layer of spongy lead within a mold and then uniformly compressing the entire mass so as to form a coherent homogeneous secondary-battery plate, substantially as described.

In testimony whereof I have signed my name to this specification in the presence of two subscribing witnesses.

PEDRO G. SALOM.

Witnesses:
 WILL. A. BARR,
 JOS. H. KLEIN.